United States Patent [19]

Herlitz et al.

[11] Patent Number: 4,961,111
[45] Date of Patent: Oct. 2, 1990

[54] VIDEO INSPECTION SYSTEM FOR HAZARDOUS ENVIRONMENTS

[75] Inventors: Nils G. Herlitz; Karl L. Iglehart; John S. Sentell, all of Baton Rouge, La.

[73] Assignee: Safe T. V., Inc., Baton Rouge, La.

[21] Appl. No.: 383,182

[22] Filed: Jul. 21, 1989

[51] Int. Cl.$^5$ .............................................. H04N 7/18
[52] U.S. Cl. ................................... 358/100; 358/335; 362/22
[58] Field of Search ................. 358/99, 100, 108, 210, 358/335; 362/22

[56] References Cited

U.S. PATENT DOCUMENTS

| | | | |
|---|---|---|---|
| 2,852,600 | 9/1958 | Jenkins | 358/100 |
| 2,916,548 | 12/1959 | Aker | 358/100 |
| 2,971,259 | 2/1961 | Hahnau et al. | 358/100 |
| 3,021,386 | 2/1962 | Clark | 358/100 |
| 3,066,969 | 12/1962 | Camac | 358/100 |
| 3,609,236 | 9/1971 | Heilman | 358/100 |
| 3,715,484 | 2/1973 | Latall | 358/100 |
| 3,958,080 | 5/1976 | Schadler | 358/100 |
| 4,346,404 | 8/1982 | Gantenbrink | 358/99 |
| 4,485,398 | 11/1984 | Chapin | 358/99 |
| 4,847,602 | 7/1987 | Altland | 358/100 |

Primary Examiner—Howard W. Britton
Attorney, Agent, or Firm—Robert C. Tucker; William David Kiesel

[57] ABSTRACT

A video inspection system for hazardous environments is provided, comprising a housing, sealable so as to contain a pressurized gas therein, having a view opening therein and further including a valve for introducing pressurized gas into the housing, connected to the housing; and a transparent lens, sealingly affixed across the view opening; a camera for recording visual images through the view opening, mounted within the housing; and a power supply, for powering the camera, mounted within the housing and operatively connected to the camera. A method for operating the above system is also provided, including the steps of substantially purging undesirable gases from the interior of the housing; sealing the housing, eliminating external connections thereto; introducing non-flammable gas to the interior of the housing until the pressure in the housing reaches a desired level; and operating the camera within the housing. The system may also be operated as a portable lighting system without the camera.

20 Claims, 4 Drawing Sheets

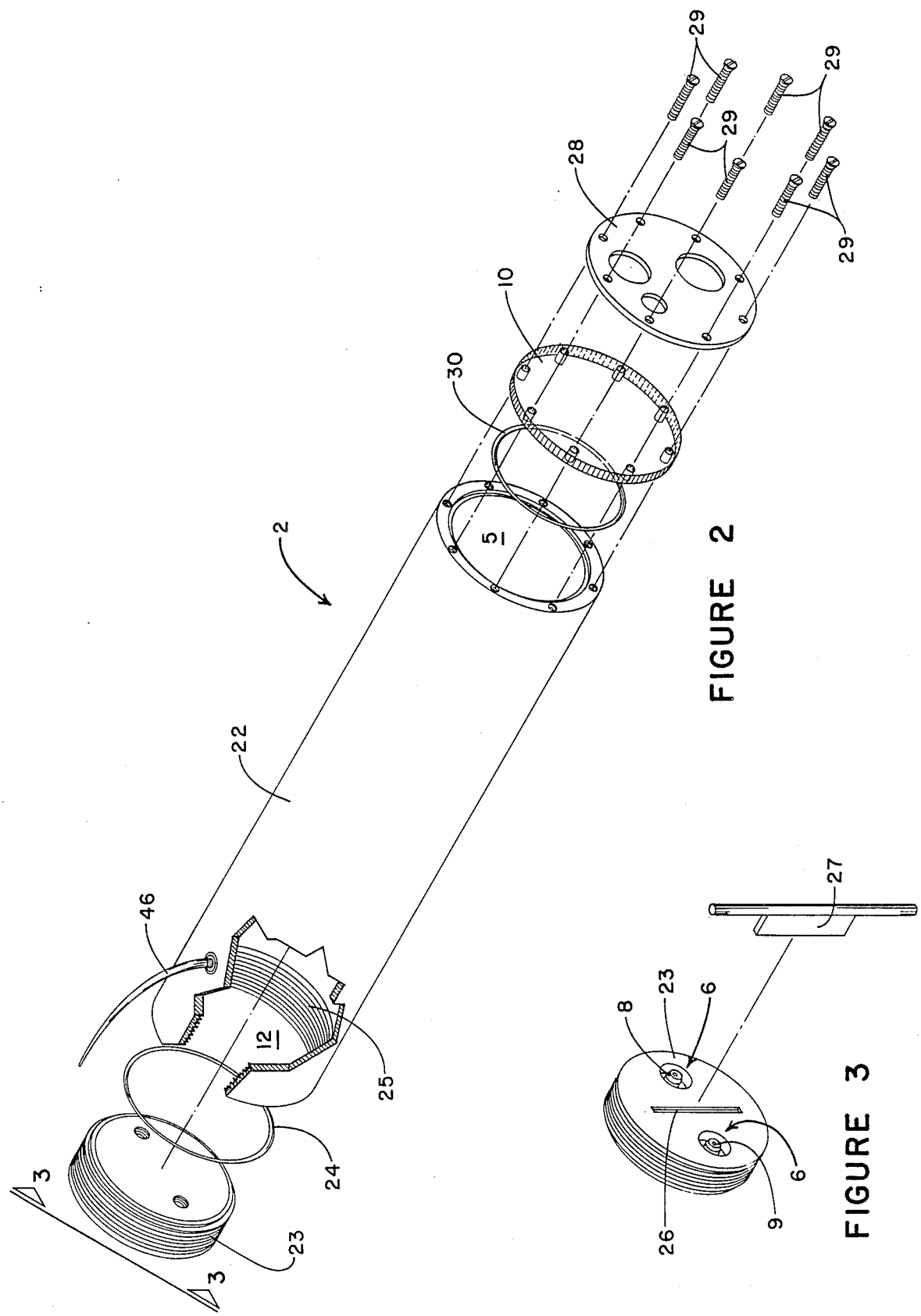

VIDEO INSPECTION SYSTEM FOR HAZARDOUS ENVIRONMENTS

BACKGROUND OF THE INVENTION

1. Field of the Invention.

This invention relates generally to video inspection systems which are used to view selected difficult access areas and, more particularly, to such systems which are used to access areas in potentially explosive environments.

2. Prior Art.

In the field of video inspection systems, it is desirable to provide maximum protection for a video camera and associated equipment which is placed in difficult access areas. Usually a camera is placed in some sort of casing which protects the camera as it is lowered into a tank or pulled through a pipeline or other enclosure during inspection operations. When the environment within the enclosure is explosive, extreme measures must be taken to isolate the inspection system from the explosive environment.

One such system utilizes a positive pressure displacement method, wherein a camera casing is pressurized with non-flammable gas through a gas line, which is connected to the casing. Electrical energy is provided to a video camera and lighting system within the casing by electrical cables connected through the casing. Such systems are inherently dangerous since the industrial conditions often encountered by video inspections include elements which can damage or cut gas lines and electrical cables. If the gas service is interrupted, leakage could allow flammable gases or fumes into the casing, where arcing of electrical components could cause an explosion. Of course, should external electrical cables become damaged, arcing could occur outside of the casing.

SUMMARY OF THE INVENTION

Therefore, it is an object of this invention to provide a video inspection system for hazardous environments which eliminates the need for a constant external supply of non-flammable gas or electricity.

It is another object of this invention to provide a video inspection system for hazardous environments which interrupts power 10 to the camera and/or lighting unless a desirable pressure is maintained within the system.

It is still another object of this invention to provide a video inspection system for hazardous environments which provides an internal back-up supply of non-flammable gas which can be released in the event of a leak in the system.

It is a further object of this invention to provide a video inspection system for hazardous environments which quickly cools system lighting in the event of an unanticipated pressure drop within the system.

It is yet a further object of this invention to accomplish desired combinations of the above objects.

Accordingly, a video inspection system for hazardous environments is provided, comprising a housing, sealable so as to contain a pressurized gas therein, having a view opening therein and further including a valve for introducing pressurized gas into the housing, connected to the housing, and a transparent lens, sealingly affixed across the view opening; a camera for recording visual images through the view opening, mounted within the housing; and a power supply, for powering the camera, mounted within the housing and operatively connected to the camera. The system can be supplied with a pressure switch which interrupts power to the camera if pressure within the housing is not within desired limits. Further, the system can be supplied with a purge gas tank and solenoid valve, which releases pressurized non-flammable gas into the housing should housing pressure drop below a desired level.

BRIEF DESCRIPTION OF THE DRAWINGS

FIG. 2 is an exploded perspective view of an embodiment of the housing of the invention.

FIG. 3 is a perspective view of an embodiment of the back plate of the invention.

DETAILED DESCRIPTION OF PREFERRED EMBODIMENTS OF THE INVENTION

Figure 1:
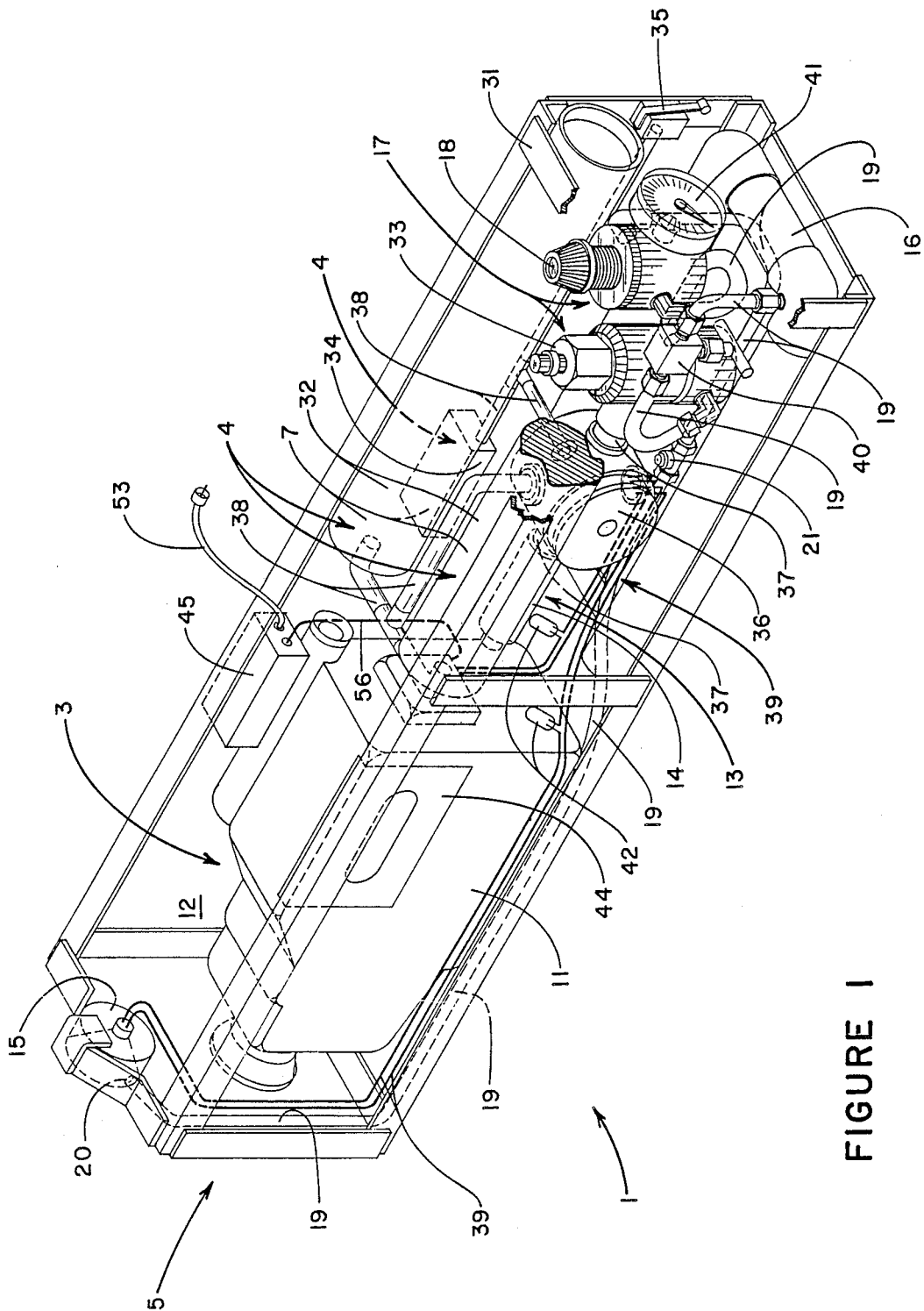
FIG. 1 is a cutaway perspective view of an embodiment of the internal components of the invention, with the housing removed for clarity.

As shown in FIG. 1, the video inspection system 1 generally comprises a housing 2 (shown in FIG. 2), which contains a camera means 3, such as video camera 11 (such as a Sony CCD-F40 video camera recorder), for recording visual images, and a power supply 4, such as batteries 7, for powering camera means 3. Housing 2 is sealable so as to contain a non-flammable pressurized gas, such as nitrogen, therein and is provided with a view opening 5 and lens 10 through which camera means 3 may view the outside environment. A means 6, for introducing pressurized gas into housing 2 is provided. Means 6 may include a fill valve 8 and purge valve 9 as shown. A lighting means, such as light 15, may also be provided for necessary illumination through view opening 5. Thus the basic system 1 allows camera 11 to be operated in a safe, pressurized environment without dangerous external connections. If a small leak or major breakage occurs in housing 2, the positive differential pressure within housing 2 causes the gas from interior 12 to flow out of housing 2, temporarily maintaining the non-explosive integrity of interior 12.

However, it is desirable that the system 1 provide for greater safety during operation in hazardous environments so as to guard against explosion. Thus, a means 13, for preventing operation of camera 11 when the pressure within housing 2 is below a desired level, is provided. Means 13 preferably includes an explosion-proof pressure switch 14 (such as Sigma-Netics, Inc. No. 703-UAA switch), which prevents operation of camera 11 and light 15 when pressure within housing 2 is below a desired level. Pressure switch 14 can be set to provide power to camera 11 and light 15 when internal pressure reaches a desired threshold pressure, and to cut power when internal pressure falls below a desired level. For example, it has been found that an internal pressure of twelve pounds per square inch is desirable to establish camera 11 and light 15 power, while an internal pressure of eight pounds per square inch causes power to be cut prior to complete depressurization of housing 2. Also, the lower pressure level necessary for disconnection of power allows for minor leakage to take place without disabling the system 1. Thus, should housing 2 be cracked or have its integrity otherwise compromised, power systems which could possibly arc and cause an explosion in hazardous environments are disabled before any hazardous environment can enter housing 2.

In order to insure additional system safety, further redundancy may be provided. A purge gas tank 16 is provided inside housing 2, and is filled with a pressurized non-flammable purge gas, (which may be in liquid state within purge gas tank 16) such as Freon ®. A means 17, for releasing gas from purge tank 16 when pressure within housing 2 falls below a desired level, is mounted within housing 2 and connected to purge gas tank 16. Means 17 preferably comprises a solenoid valve 33 and pressure regulator 18. Solenoid valve 33 is set to release gas from purge gas tank 16 when pressure within housing 2 falls below a desired threshold. For example, solenoid valve 33 (such as a Skinner Valve No. X54LB2150 mini-solenoid valve) can be set to release gas from tank 16 when pressure within housing 2 falls below eight pounds per square inch, slowing the rate of decrease in pressure within housing 2 and providing additional time for system shutdown should a major leak in housing 2 occur. Regulator 18 (such as a Norgren RO6-221-RHKA mini-regulator) controls the release of purge gas at a desired rate of flow. Further safety is provided by purge distribution line 19 which distributes purge gas throughout interior 12. Light jet 20 provides a discharge point in distribution line 19 and is directed upon light 15 such that purge gas cools light 15 as the gas flows into housing 2. Additional purge gas distribution is provided by mid-jet 21.

As can be seen in FIGS. 1–3, housing 2 preferably includes a tubular case 22. Back plate 23, having an O-ring 24, is threaded so as to engage with threads 25 in case 22. Fill valve 8 and purge valve 9 are mounted on back plate 23. Slot 26 allows back plate 23 to be tightened and loosened by T-wrench 27. Lens 10 is constructed of a material such as polycarbonate and is secured over view opening by face plate 28 and screws 29. O-ring 30 provides a seal for lens 10. Preferably, case 22 and back plate 23 are constructed of a spark-proof material, such as polyvinyl chloride.

Figure 4:
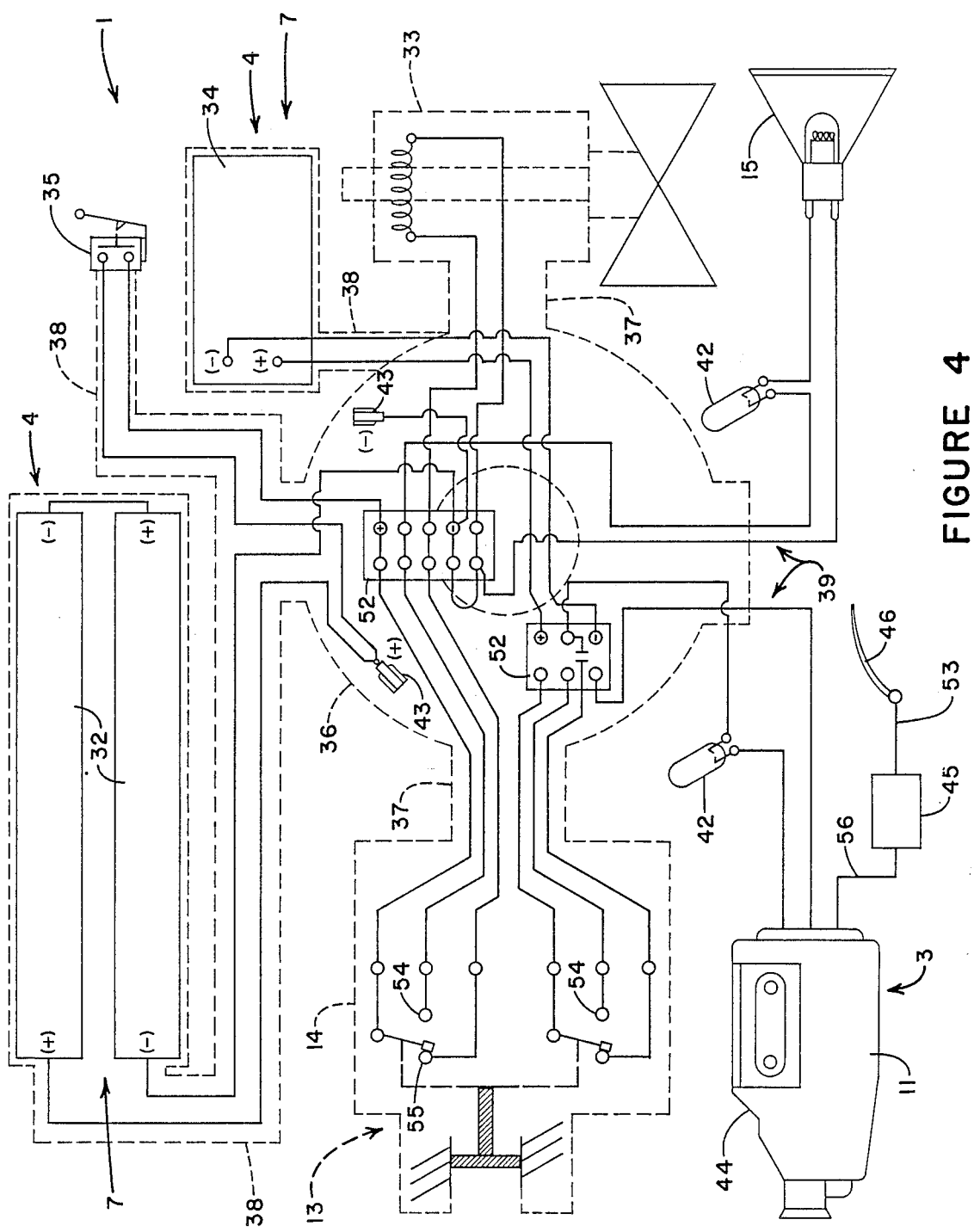
FIG. 4 is an electrical schematic diagram of an embodiment of the invention.

As shown in FIG. 1, mounting frame 31 provides a means for attachment of various internal components of the system 1. Thus, the internal components are easily removable and serviceable. A sealed explosion-proof twelve-volt battery pack 32 provides power to solenoid valve 33 and light 15. A sealed explosion-proof six-volt battery pack 34 powers camera 11. A spring-loaded, explosion-proof power switch 35 (such as Haydon Switch and Instrument, Inc. Series 6100 Environmentally sealed basic switch) closes when back plate 23 is installed, providing power from twelve-volt battery pack 32. Pressure switch 14 and solenoid valve 33 and their associated wiring are connected to an explosion-proof junction box 36 via explosion-proof sealed conduits 37. Wires running from power switch 35 to junction box 36, from battery pack 32 to junction box 36, and from battery pack 34 to junction box 36 are contained by sealed conduits 38. Junction box 36 is preferably explosion-proof, such as those manufactured by Appleton Electric Company. Thus, all wiring which is unprotected by pressure switch 14 is isolated from the environment of interior 12. As shown, it is not necessary to enclose to encase wiring 39 exiting junction box 36 and running to camera 11 and light 15. However, it is important that the point where such wiring 39 exits junction box 36 be sealed to maintain the explosion-proof integrity or the interior of junction box 36. FIG. 4 shows the electrical layout of the system 1, including terminal boards 52.

Purge distribution line 19 runs from purge tank 16 through cutoff valve 40, through solenoid valve 33, through pressure regulator 18 and out to mid-jet 21 and light jet 20. A pressure gauge 41 is connected to regulator 18 to enable the user to read purge gas pressure and verify operation of solenoid valve 33.

System operation is simple, safe and effective. Twelve-volt battery pack 32 is charged via charger connections 43 (see FIG. 4) and a charged six-volt battery pack 34 is attached to the system 1 (six-volt battery pack 34 may be charged through Camera 11). Purge gas (such as Freon ®) is added to purge gas tank 16 through cutoff valve 40, cutoff valve 40 is attached to purge distribution line 19, and cutoff valve 40 is opened. Mounting frame 31 containing internal components is then placed inside case 22 and oriented such that Camera 11 will record images through view opening 5. Back plate 23 is screwed into threads 25 to a point where a substantial seal is established, but not so far as to activate power switch 35. Undesirable gases (flammable gases and/or air) are purged from the system by injecting non-flammable gas (such as nitrogen) through fill valve 8 and purging through purge valve 9 until interior 12 is substantially filled with non-flammable gas at a desired pressure, such as greater than twelve pounds per square inch.

When camera operation is desired, back plate 23 is simply further tightened to engage power switch 35. If interior pressure is above a pre-set value, such as twelve pounds per square inch, then pressure switch 14 closes, supplying power to and activating camera 11 and light 15. When pressure switch 14 is open, solenoid valve 33 is activated and supplies gas from purge gas tank 16 to regulator 18. Thus, when gas pressure within interior 12 is at a desired level, camera 11 and light 15 operate. Camera 11 preferably includes a recorder 44 for recording images on video tape. However, a means for transmitting a signal to a point remote from housing 2, such as transmitter/receiver 45 known in the art (with antenna 46 connected via cable 53) may be utilized to transmit video images from the system 1 to a remote location as well as to receive remote control data to operate camera 11 and/or light 15. If desired, mercury switches 42 may be utilized to operate camera 11 and light 15 only when the system 1 is oriented at a desired angular position.

As stated previously, when a leak occurs, pressure switch 14 will open contacts 54 (See FIG. 4) to camera 11 and/or light 15 when pressure equals a threshold level, such as eight pounds per square inch. Solenoid valve 33 is energized at secondary contact 55 opening solenoid valve 33 (regulated by regulator 18) when interior pressure falls below a threshold level, such as eight pounds per square inch, to a second threshold level. Purge gas then flows through mid-jet 21 and light jet 20, slowing depressurization and cooling light 15. Camera 11 and light 15 will not operate again until internal pressure rises to the initial threshold pressure (twelve pounds per square inch in the example used herein).

Figure 5:
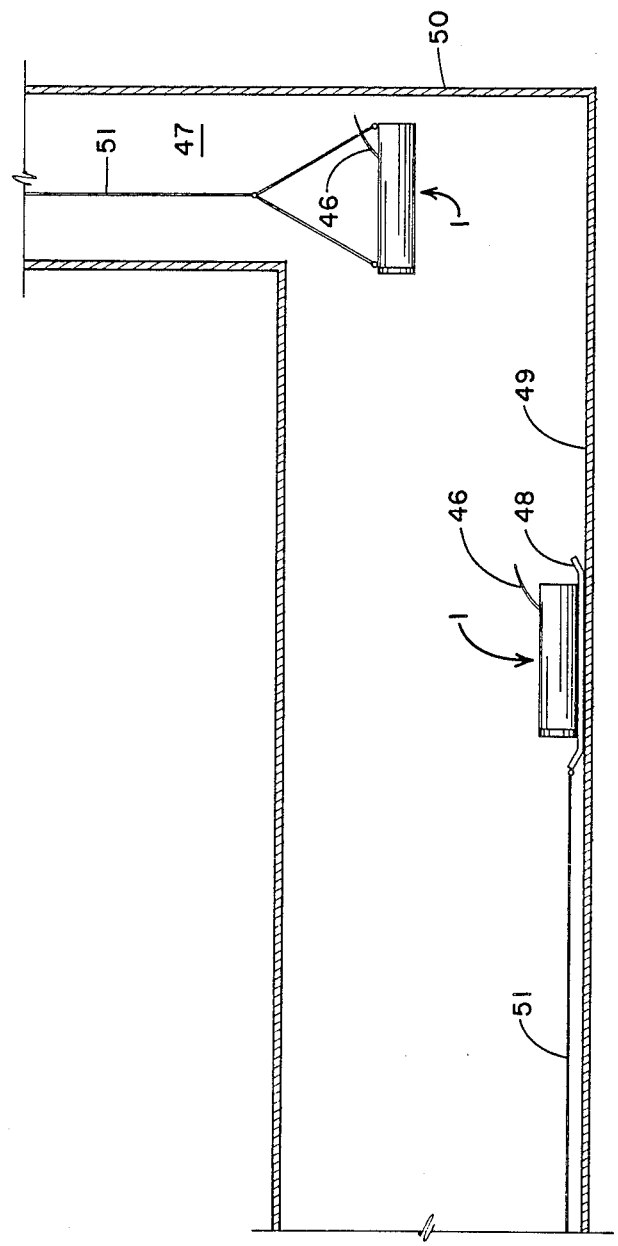
FIG. 5 is a sectional view of an enclosure illustrating the use of the invention.

Thus, a video inspection system 1 is provided which enables the user to safely inspect explosive or other hazardous environments. As shown in FIG. 5, the system 1 may be lowered through a shaft 47 or other enclosure for inspection, or be placed on skids 48 and pulled along the bottom 49 of an enclosure 50. Support lines 51 may be used to lower or pull the system during operation, as shown. Support lines 51 may also be used to send or receive signals to or from transmitter/receiver 45 through its antenna 46. Also, camera 11 may be eliminated and light 15 enlarged so as to provide an explosion-proof portable lighting system. Of course, other embodiments of the invention 1 will occur to those skilled in the art, and are intended to be included within the scope and spirit of the following claims.

I claim:

1. A video inspection system for hazardous environments, comprising:
   a. a housing, sealable so as to contain a pressurized gas therein, having a view opening therein and further including:
      i. a means for introducing pressurized gas into said housing, connected to said housing; and
      ii. a transparent lens, sealingly affixed across said view opening;
   b. a camera means for recording visual images through said view opening, mounted within said housing; and
   c. a power supply, for powering said camera means, mounted within said housing and operatively connected to said camera means.

2. A video inspection system for hazardous environments according to claim 1, further comprising a purge gas tank mounted within said housing and a means for releasing gas from said purge gas tank when the pressure within said housing falls below a desired level, mounted within said housing and connected to said purge gas tank.

3. A video inspection system for hazardous environments according to claim 1, wherein said camera means includes a means for transmitting a signal to a point remote from said housing.

4. A video inspection system for hazardous environments according to claim 1, wherein said housing includes a cylindrical casing having a removable back plate on one end and wherein said view opening is located at the other end of said casing.

5. A video inspection system for hazardous environments according to claim 2, wherein said means for releasing gas from said purge gas tank when the pressure within said housing falls below a desired level includes a gas regulator.

6. A video inspection system for hazardous environments according to claim 1, further comprising a means for preventing operation of said camera means when the pressure within said housing is below a desired level, mounted within said housing and operatively connected between said camera means and said power source.

7. A video inspection system for hazardous environments according to claim 6, wherein said means for preventing operation of said camera means when the pressure within said housing is below a desired level includes a pressure switch.

8. A video inspection system for hazardous environments according to claim 6, further comprising a purge gas tank mounted within said housing and a means for releasing gas from said purge gas tank when the pressure within said housing falls below a desired level, mounted within said housing and connected to said purge gas tank.

9. A video inspection system for hazardous environments according to claim further comprising a lighting means for directing light through said view opening, mounted within said housing and directed through said view opening.

10. A video inspection system for hazardous environments according to claim 9, further comprising a purge gas tank mounted within said housing and a means for releasing gas from said purge gas tank when the pressure within said housing falls below a desired level, said means for releasing gas being mounted within said housing and connected to said purge gas tank.

11. A video inspection system for hazardous environments according to claim 10, wherein said means for releasing gas from said purge gas tank includes a purge distribution line having at least one discharge point directed upon said lighting means.

12. A video inspection system for hazardous environments according to claim 9, further comprising a means for preventing operation of said camera means when the pressure within said housing is below a desired level, mounted within said housing and operatively connected between said camera means and said power source.

13. A video inspection system for hazardous environments according to claim 12, further comprising a purge gas tank mounted within said housing and a means for releasing gas from said purge gas tank when the pressure within said housing falls below a desired level, mounted within said housing and connected to said purge gas tank.

14. A video inspection system for hazardous environments according to claim 13, wherein said means for releasing gas from said purge gas tank includes a purge distribution line having at least one discharge point directed upon said lighting means.

15. In a video inspection system for hazardous environments, comprising a housing, sealable so as to contain a pressurized gas therein, having a view opening therein and further including a means for introducing pressurized gas into said housing, connected to said housing and a transparent lens, sealingly affixed across said view opening; a camera means for recording visual images through said view opening, mounted within said housing; and a power supply, for powering said camera means, mounted within said housing and operatively connected to said camera means, a method for video inspection of hazardous environments, comprising the steps of:
   a. substantially purging undesirable gases from the interior of said housing;
   b. sealing said housing, eliminating external connections thereto;
   c. introducing non-flammable gas to the interior of said housing until the pressure in said housing reaches a desired level; and
   d. operating said camera means within said housing.

16. A method for preventing explosion when said video inspection system is operating in a hazardous environment according to claim 15, comprising the additional step of switching off power to said camera means when the pressure in said housing falls below a threshold level.

17. In a video inspection system for hazardous environments, comprising a housing, sealable so as to contain a pressurized gas therein, having a view opening therein and further including a means for introducing pressurized gas into said housing, connected to said housing and a transparent lens, sealingly affixed across said view opening; a camera means for recording visual images through said view opening, mounted within said housing; a power supply, for powering said camera means, mounted within said housing and operatively connected to said camera means; and a purge gas tank mounted within said housing and containing pressurized non-flammable gas, a method for preventing explosion when said video inspection system is operating in a hazardous environment should a leak develop in said housing, comprising the steps of:

a. substantially purging undesirable gases from the interior of said housing;

b. sealing said housing, eliminating external connections thereto;

c. introducing non-flammable gas to the interior of said housing until the pressure in said housing reaches a desired level;

d. operating said camera means within said housing; and e. switching off power to said camera means when the pressure in said housing falls below a first threshold level; and f. releasing gas from said purge gas tank when the pressure in said housing falls below said threshold level to a second threshold level.

18. A video inspection system for hazardous environments, comprising:

a. a housing, sealable so as to contain a pressurized gas therein, having a view opening therein and further including:

i. a means for introducing pressurized gas into said housing, connected to said housing; and ii. a transparent lens, sealingly affixed across said view opening;

b. a lighting means for directing light through said view opening, mounted within said housing and directed through said view opening.

c. a power supply, for powering a lighting means, mounted within said housing and operatively connected to said lighting means.

19. A video inspection system for hazardous environments according to claim 18, further comprising a means for preventing operation of said lighting means when the pressure within said housing is below a desired level, mounted within said housing and operatively connected between said lighting means and said power source.

20. A video inspection system for hazardous environments according to claim 19, further comprising a purge gas tank mounted within said housing and a means for releasing gas from said purge gas tank when the pressure within said housing falls below a desired level, mounted within said housing and connected to said purge gas tank.

* * * * *